United States Patent [19]
Ainscow et al.

[11] Patent Number: 5,800,791
[45] Date of Patent: Sep. 1, 1998

[54] COLUMN BAFFLES FOR SUSPENSIONS WITH PRECIPITATING SUBSTANCES

[75] Inventors: Stuart Ainscow, Winterthur, Switzerland; Rolf Sittkus, Aulendorf, Germany

[73] Assignee: Sulzer Chemtech AG, Winterthur, Switzerland

[21] Appl. No.: 512,874

[22] Filed: Aug. 9, 1995

[30] Foreign Application Priority Data

Aug. 31, 1994 [EP] European Pat. Off. ............ 94810497

[51] Int. Cl.$^6$ .................. B01D 3/14; B01D 3/24
[52] U.S. Cl. ............ 422/228; 202/158; 261/114.1; 422/161; 422/168
[58] Field of Search .................. 422/144, 168, 422/213, 216, 228, 193, 224, 220, 161; 423/488; 261/114.4, 109; 202/234, 236, 158, 197; 203/89, 92

[56] References Cited

U.S. PATENT DOCUMENTS

| | | | |
|---|---|---|---|
| 2,343,646 | 3/1944 | Dinley | 202/158 |
| 4,201,628 | 5/1980 | Church et al. | 202/158 |
| 4,303,479 | 12/1981 | Church | 203/89 |

FOREIGN PATENT DOCUMENTS

| | | |
|---|---|---|
| 0 216 292 | 4/1987 | European Pat. Off. . |
| 0 504 622 | 9/1992 | European Pat. Off. . |
| 1.171.119 | 1/1959 | France . |
| 25 16 078 | 10/1975 | Germany . |

*Primary Examiner*—Hien Tran
*Attorney, Agent, or Firm*—Townsend and Townsend and Crew

[57] ABSTRACT

Column baffles (1) for suspensions with precipitating substances which are provided for a substance transfer between the suspension and a vapour phase moving in a counter-flow. The baffles include membrane-like elements (2, 3; 5) which, on the one hand, bring about a cascade-like formation of liquid curtains with respect to the suspension and, on the other hand, with respect to the vapour phase, for chicanes for strong changes of direction for the vapour flow which lead to the formation of eddies in the vapour phase. In accordance with the invention, the membrane-like elements are made from a flexible material and are secured at few sites in the column (100) such that an oscillating movement or fluttering movement of the elements can be excited by the flowing media, in particular by eddies in the vapour phase.

10 Claims, 3 Drawing Sheets

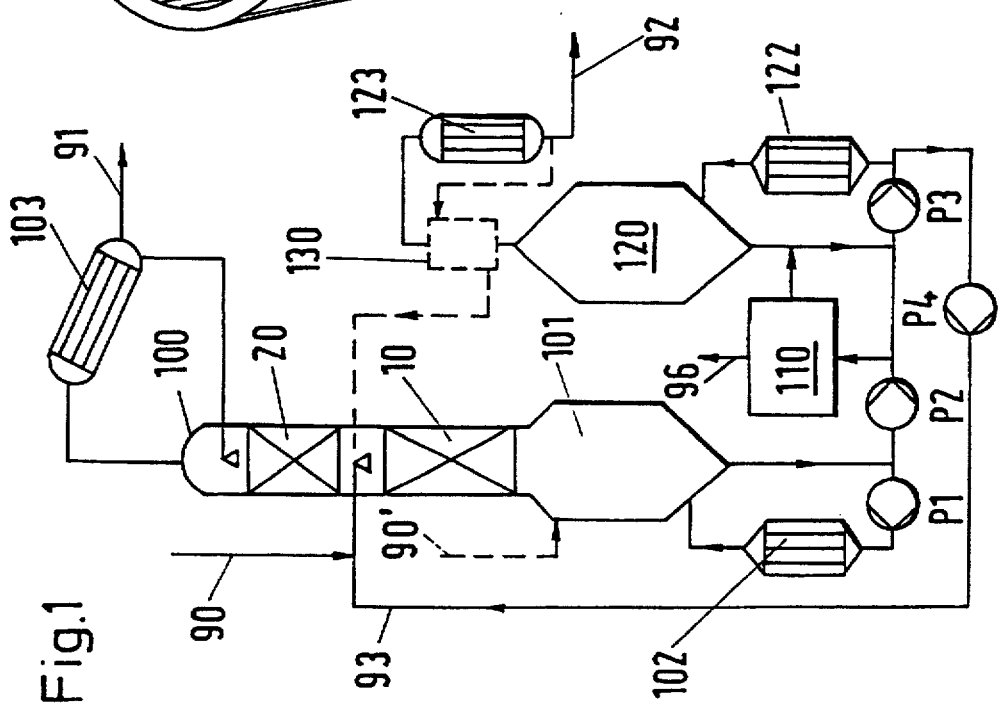
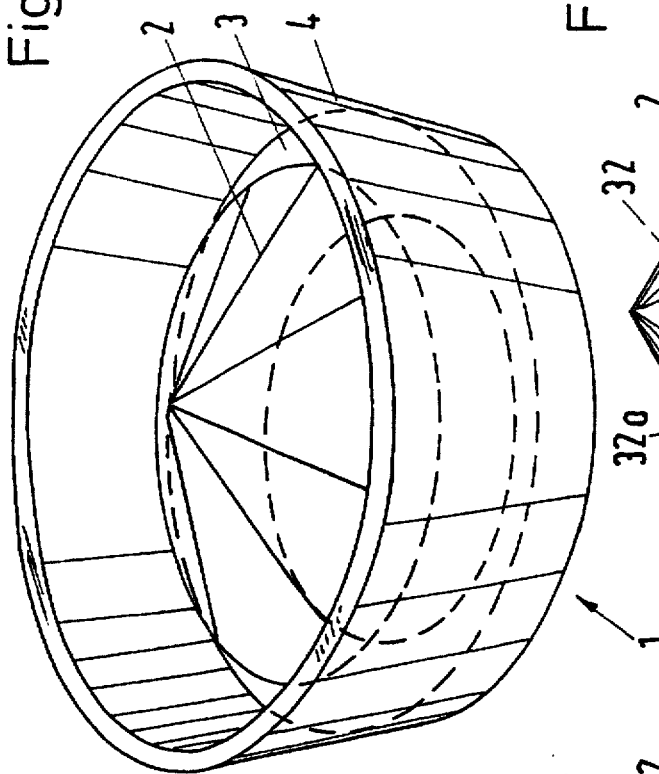
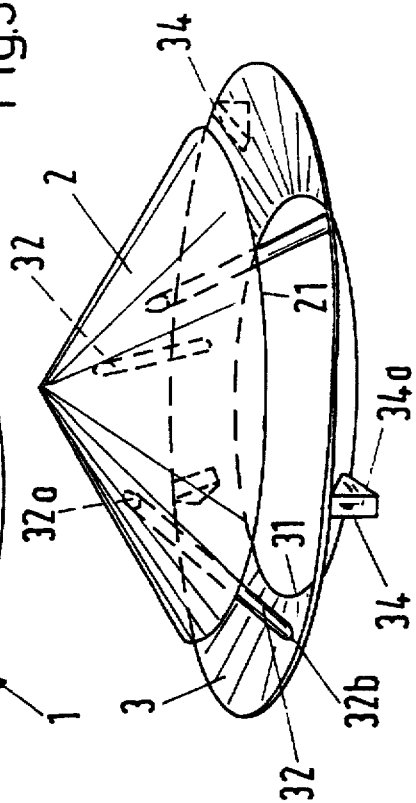

COLUMN BAFFLES FOR SUSPENSIONS WITH PRECIPITATING SUBSTANCES

The invention relates to column baffles or inserts for suspensions with precipitating substances. Baffles producing chicanes for strong changes of direction are utilized with vibrating edges to facilitate both precipitation and the release of the precipitant from the baffles. It also relates to plants with such column baffles and to a use of such plants.

BACKGROUND OF THE INVENTION

In a known method in which a flue gas washing process is combined with a production of hydrogen chloride (HCl) or of concentrated hydrochloric acid, a crude acid which originated during the flue gas washing process is treated in a rectification column, with a concentrated $CaCl_2$-solution being used as entrainer. If the crude acid contains sulphate, then a precipitation results during the mixing with the entrainer, in which gypsum-particles are deposited. The entrainer circulates in a circulation in which it is continuously processed (upgrading through concentration and partial removal of solids). Therefore, there are suspended particles in the circulated solution. For the customary packings which are used in the stripper part of the rectification column, a deposit of particles occurs which would finally lead to the clogging of the packing, if the removal of the deposits were not periodically taken care of.

SUMMARY OF THE INVENTION

It is the object of the invention to provide column baffles in which no such deposits of particles arise or in which deposits occur to an at least much smaller extend, so that a cleaning of the baffles is required less often. This object is satisfied by the measures disclosed in this specification. The deposit of particles is prevented or at least hindered by means of the oscillating movement or fluttering movement of the baffles.

Baffles shaped from cone sections formed by flat laminar material and preferably made from plastic relate to advantageous embodiments of the baffles in accordance with the invention. Plants in which such baffles are provided are disclosed. The disclosed baffles are particularly useful for the treatment of crude acid containing hydrochloric acid and sulfate from a flue gas washing process. In such a process, the hydrogen chloride is separated off the amplification portion of the rectification column and a calcium chloride solution is used as an entrainer.

DESCRIPTION OF THE DRAWINGS

The invention will be described in the following with reference to the drawing in which are shown:

FIG. 1 is a scheme of a plant for which the baffles in accordance with the invention are provided, FIG. 2 is a length of pipe which is a part of a first embodiment of the baffles in accordance with the invention, FIG. 3 is membrane-like elements of the length of pipe of FIG. 2.

DESCRIPTION OF THE PREFERRED EMBODIMENTS

Figure 4:
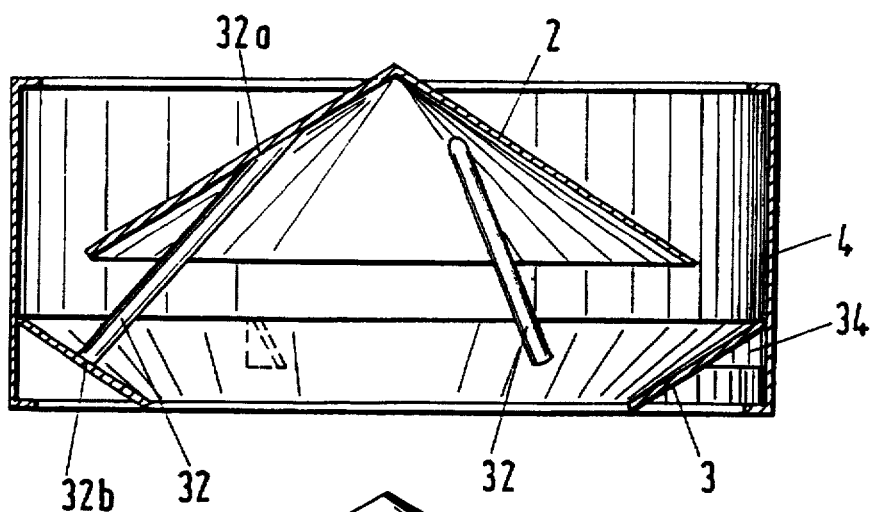
FIG. 4 is a section through the length of pipe.

The plant of FIG. 1 comprises the following components: rectification column 100 with stripper part 10, amplifier portion 20, head condenser 103 and sump/evaporator 101, circulation pump P1 as well as heating chamber 102; entrainer circulation with pumps P2, P3, as well as P4, recirculation conduit 93, clarification system 110, and concentration stage 120 to which a heating chamber 122 and a condenser 123 are allocated.

The crude acid is fed into the plant from a flue gas washer at the reference numeral 90; the HCl-gas is drawn off and fed to a non-represented absorber at 91, where concentrated hydrochloric acid is produced; a vent exhaust condensate which has a small HCl-concentration is drawn off at 92 and returned to the flue gas washer; and clarified solids are outwardly transferred from the plant at 96.

If the crude acid is directly fed into the sump 101 at 90' instead of at 90, then the deposit problem is defused, as has been experimentally shown. However, in this case, the solution entering into the evaporator 120 has a higher HCl-concentration and it is therefore advantageous, if hydrochloric acid is separated off via rectification in an additional plant component 130 and guided back into the rectification column 100. A similar method is known from EP 0 504 622. This printed document is referred to for more detailed statements about the method.

The length of pipe 1 of FIG. 2 is part of the stripper part 10, the packing of which is formed in accordance with the invention. It comprises—see FIG. 3—two membrane-like elements 2 and 3, in particular a conical hat 2 and a truncated cone-like collar 3. These two elements form an alternating arrangement along the column axis when built into the column. The two elements overlappingly cover over the cross-section when viewed in the normal projection to the column cross-section.

In accordance with the invention, the membrane-like elements are made from a flexible material, for example, from a plastic, in particular from polyvinylidenefluoride. They are secured in the column such that an oscillating movement or fluttering movement of the elements can be excited by the flowing media.

In the present working example, the hat 2 is secured on the collar 3 via three pipes 32, with the securing sites 32a and 32b being selected such that in particular the edges 21 and 31 can oscillate or flutter in an unhindered manner. The collar 3 is secured to the cylinder 4 of the length of pipe 1 with three securing pieces 34 (contact surfaces 34a). In FIG. 4, it is represented as to how the elements 2 and 3 are arranged in the length of pipe. Through the use of a very flexible material, the collar 3 can also be welded to the cylinder 4 over the entire periphery.

Figure 5:
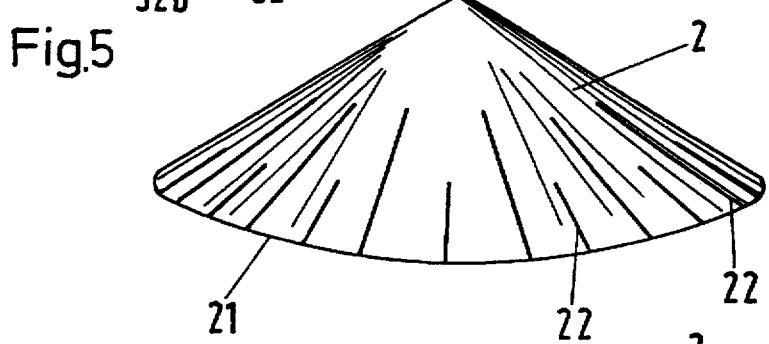
FIG. 5 is a conical hat with radial recesses.
Figure 6:
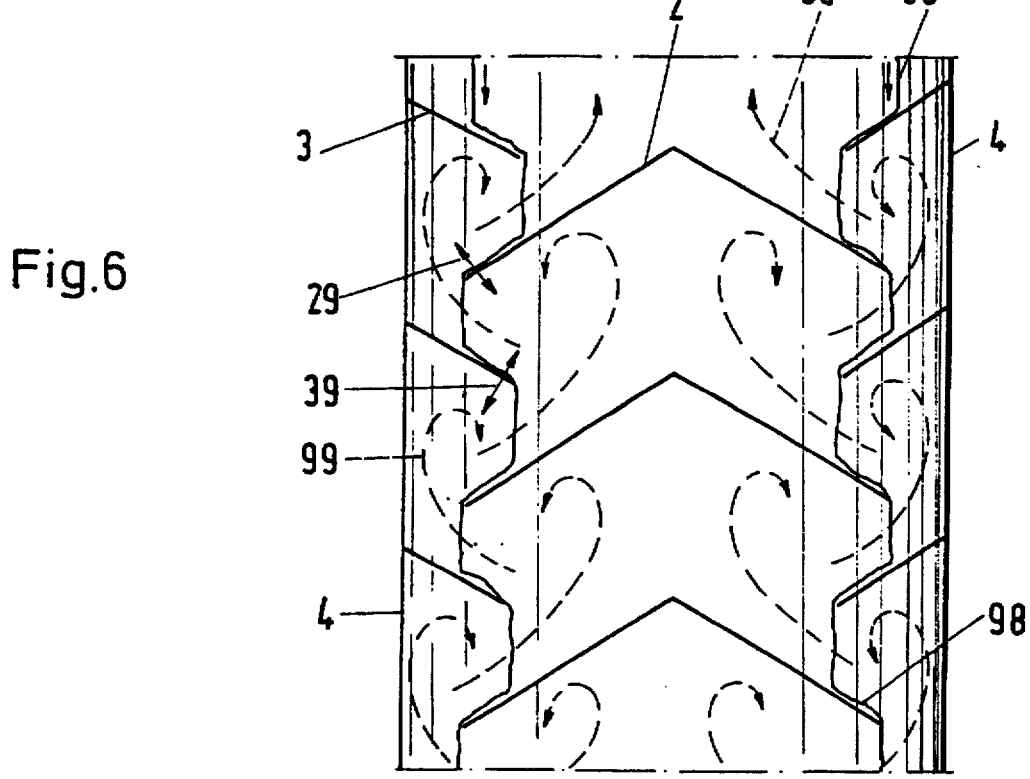
FIG. 6 is a longitudinal section through the baffles in accordance with the invention with schematically represented flow conditions.

The hat 2 in FIG. 5 shows radial recesses 22 through which an oscillating movement or fluttering movement of the edge 21 is made easier. Corresponding recesses can also be provided at the collar 3 (not represented). The longitudinal section in FIG. 6 shows the suspension 98 flowing over the baffles 2, 3 and the vapour phase 99 moving in the counter-flow. On the one hand, liquid curtains are generated in the shape of a cascade-like embodiment by means of the baffles. On the other hand, the baffles act as chicanes for strong changes of direction of the vapour flow, which causes eddies to form in the vapour phase. By means of the flowing media, an oscillating movement or fluttering movement of the membrane-like elements is excited (represented by the arrows 29, 39). It can be accomplished that the movements of the membrane-like elements are stronger via a pulsating inlet of the suspension.

Figure 7:
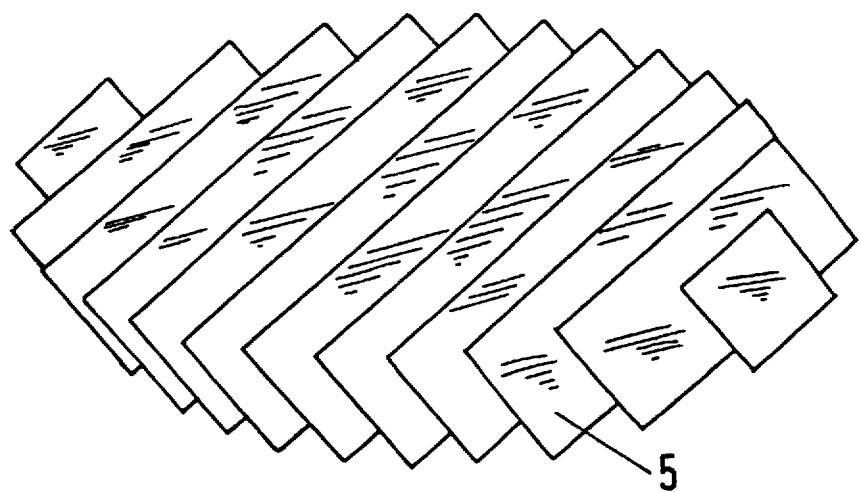
FIG. 7 is baffles with parallel lamella and FIG. 8 is a packing cut-out, longitudinally cut, with baffles in accordance with FIG. 7.
Figure 8:
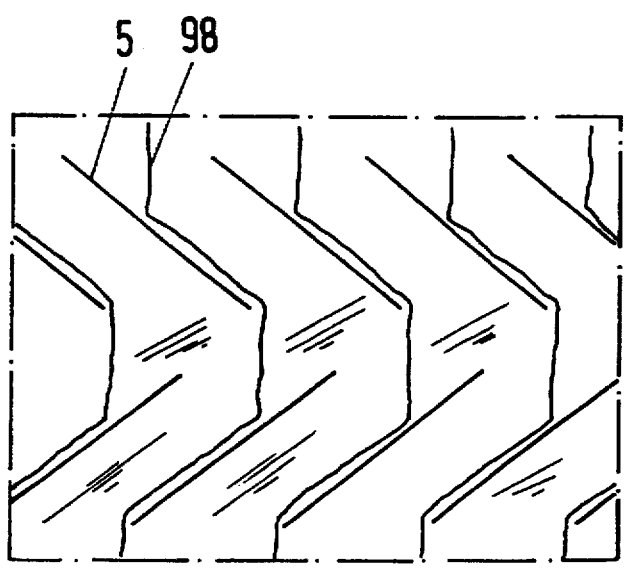

Of course, other embodiments of the membrane-like elements are possible. FIG. 7 shows an example in which these elements are formed by flat lamella 5 which are arranged in a parallel manner. FIG. 8 represents a longitudinal section through two neighbouring layers with such lamella 5.

We claim:

1. Conduit baffles for a suspension with precipitating substances comprising:

a conduit for confining flow of a suspension with precipitating substance;

at least a first member having a major surface mounted across the flow of the suspension, the first member having peripheral attachment to the conduit and defining a central aperture through which the suspension with precipitating substance flows;

at least a second member having a major surface mounted across the flow of the suspension within the conduit, the second member defining a central portion for obstructing suspension flow through the central aperture of the first member to an edge of the second member;

means for mounting the second member in spaced apart relation relative to the first member to produce chicanes for changes of direction of suspension flow through the conduit; and, the first member at the central aperture and the second member at the edge being flexible to enable flexure respectively at the central aperture and edge responsive to passage of the suspension with precipitating substance whereby precipitating substance is inhibited from deposit on the first member and on the second member.

2. Conduit baffles for suspensions with precipitating substances according to claim 1 wherein:

the second member is a conical member having the central portion for obstruction of the flow of the suspension through the central aperture of the first member and a continuous periphery defining the edge for the flow of the suspension over the edge.

3. Conduit baffles for suspensions with precipitating substances according to claim 1 wherein:

said at least a first member and said at least a second member comprise a plurality of alternating first and second members form parallel arrays in the conduit.

4. Conduit baffles for suspensions with precipitating substances according to claim 1 wherein:

the first member and second member are plastic at their respective flexible central aperture and edge.

5. Conduit baffles for suspensions with precipitating substances according to claim 1 wherein:

the conduit is vertical and the flow of suspension in the conduit is downward.

6. Conduit baffles for suspensions with precipitating substances according to claim 1 wherein:

the first member slopes downward from the peripheral attachment to the central aperture; and, the second member slopes downward from the central portion to the edge whereby precipitated substances fall downward over the first member and the second member.

7. A plant for treatment of a crude acid from a flue gas washing process comprising in combination:

a rectification column for confining flow of flue gas washing including a suspension with precipitating substance;

a stripper part in the rectification column including:

at least a first member having a major surface mounted across the flow of the suspension, the first member having peripheral attachment to the rectification column and defining a central aperture through which the suspension with precipitating substance can flow;

at least a second member having a major surface mounted across the flow of the suspension within the rectification column, the second member defining a central portion for obstructing suspension flow through the central aperture of the first member to an edge of the second member;

means for mounting the second member relative to the first member to produce chicanes for changes of direction of suspension flow through the rectification column; and, the first member at the central aperture and the second member at the edge being flexible to enable flexure respectively at the central aperture and edge responsive to passage of the suspension whereby precipitating substances are inhibited from deposit on the first member and the second member.

8. A plant for the treatment of a crude acid from a flue gas washing process according to claim 7 wherein:

a crude acid inlet is at the stripper part of the rectification column.

9. A plant for the treatment of a crude acid from a flue gas washing process according to claim 7 wherein:

the rectification column for confining the flow of flue gas washing includes a sump; and, a crude acid inlet is at the sump.

10. A plant for the treatment of a crude acid from a flue gas washing process according to claim 7 an additional rectification column in the plant connected to the rectification column; and, a vent exhaust from the additional rectification column having acid content.

* * * * *